(12) United States Patent
Maruyama et al.

(10) Patent No.: US 6,488,341 B2
(45) Date of Patent: Dec. 3, 2002

(54) BALANCE WEIGHT FOR A TWO-WHEELED VEHICLE

(75) Inventors: Saburo Maruyama, Ayase (JP); Katsuji Shibusawa, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/046,705

(22) Filed: Jan. 17, 2002

(65) Prior Publication Data

US 2002/0093241 A1 Jul. 18, 2002

(30) Foreign Application Priority Data

Jan. 18, 2001 (JP) .......................... 2001-009764
Oct. 25, 2001 (JP) .......................... 2001-327963

(51) Int. Cl.⁷ ............................................. B60B 27/00
(52) U.S. Cl. ....................................................... 301/5.21
(58) Field of Search ............................... 301/5.21, 5.22, 301/53.5

(56) References Cited

U.S. PATENT DOCUMENTS 2,122,064 A * 6/1938 Hume ....................... 301/5.21
2,195,473 A * 4/1940 Brethorst .................. 152/154.1
5,228,754 A * 7/1993 Rogers ........................ 24/295
5,733,016 A * 3/1998 Brown ....................... 301/5.21
6,238,006 B1 * 5/2001 Manojlovic ................ 301/5.21
6,250,721 B1 * 6/2001 Oba et al. .................. 301/5.21
6,364,422 B1 * 4/2002 Sakaki et al. .............. 301/5.21

FOREIGN PATENT DOCUMENTS

| JP | 2001/221289 | 8/2001 |
| JP | 2001/227591 | 8/2001 |
| JP | 2001/280423 | 10/2001 |

* cited by examiner

*Primary Examiner*—S. Joseph Morano
*Assistant Examiner*—Long Bao Nguyen
(74) *Attorney, Agent, or Firm*—Pillsbury Winthrop LLP

(57) ABSTRACT

A balance weight for a two-wheeled vehicle includes a weight made from iron and a clip made from spring steel. The weight includes a first axial end, a second, opposite axial end, a transversely extending intermediate surface, and a first laterally extending groove for holding the clip therein having a groove bottom portion and a groove inlet portion which is smaller in width than the groove bottom portion. The clip includes a pair of arms, a connecting portion, an engaging portion formed in the connecting portion, a bent portion bent from the connected portion toward a space between the pair of arms, and an obliquely extending portion extending obliquely in a direction away from the transversely extending intermediate surface of the weight.

10 Claims, 4 Drawing Sheets

BALANCE WEIGHT FOR A TWO-WHEELED VEHICLE

This application is based on, and claims priority from, Japanese Patent Application No. 2001-9764, filed on Jan. 18, 2001, and Japanese Patent Application No. 2001-327963, filed on Oct. 25, 2001, the content of which is incorporated herein by reference.

BACKGROUND OF THE INVENTION

1. Field of the Invention

The present invention relates to a balance weight for a two-wheeled vehicle.

2. Description of Related Art

In order to keep a rotational balance of a wheel of a two-wheeled vehicle, a balance weight is mounted to the wheel at a nipple of a spoke, i.e., a tension adjusting portion.

A conventional balance weight for a two-wheeled vehicle is made from lead. The conventional balance weight has a substantially cylindrical outside configuration with a lateral groove, concaved from an outside surface toward a center of the balance weight, which extends over an entire length of the balance weight. The balance weight is fixed to the nipple by inserting the nipple into the groove, and then pressing to deform both side portions of the groove from an outside surface so that the nipple cannot exit from the groove.

However, the conventional balance weight poses an environmental problem because it is made from lead.

If another metal other than lead, for example, iron, is used while maintaining the configuration of the conventional balance weight, the rigidity of the weight will be too great for the weight to be deformed when it is fixed to the nipple, which makes the fixing of the balance weight to the nipple difficult.

SUMMARY OF INVENTION

An object of the present invention is to provide a balance weight for a two-wheeled vehicle, which is made from iron (for example, cast iron) in substitution for lead, and can be stably fixed to a wheel, and easily mounted to the wheel.

The above object can be performed by a balance weight for a two-wheeled vehicle according to the present invention, as follows:

A balance weight for a two-wheeled vehicle according to the present invention includes a weight made from iron and a clip made from spring steel.

The weight comprises an outside surface, a first axial end, a second, opposite axial end, a transversely extending intermediate surface located between the first end and the second end, a first axially extending portion located between the first end and the intermediate surface, a second axially extending portion located between the second end and the intermediate surface, a first laterally extending groove for holding the clip, formed in the first axially extending portion, and having a groove bottom portion and a groove inlet portion, the groove inlet portion being smaller in width than the groove bottom portion, and a second laterally extending groove formed in the second axially extending portion so as to recede from the outside surface.

The clip includes a pair of arms, a connecting portion connecting the pair of arms and which is disposed within and held by the first laterally extending groove, an engaging portion formed in the connecting portion and raised in a direction opposite to said pair of arms, a bent portion connected to the connecting portion at one width end proximate to the transversely extending intermediate surface of the weight and bent from the one width end toward a space between the pair of arms, and an obliquely extending portion connected to the bent portion and extending axially obliquely in a direction away from the transversely extending intermediate surface of the weight.

When the balance weight is mounted to the two-wheeled vehicle, the pair of arms and the obliquely extending portion of the clip elastically contact or hold a nipple of a spoke of the two-wheeled vehicle, whereby the clip is fixed to the nipple. The first laterally extending groove holds the clip, and the engaging portion is pressed to the weight, whereby the weight is fixed to the clip.

With the balance weight for a two-wheeled vehicle according to the present invention, since the balance weight is made from iron, the balance weight is environmentally friendly, unlike the conventional balance weight made from lead.

The balance weight is mounted to a wheel of a two-wheeled vehicle at a nipple (a spoke adjusting portion) of the wheel. The nipple is inserted into the second laterally extending groove of the weight, while the pair of arms of the clip is widened to receive the nipple in the clip. The pair of arms and the obliquely extending portion of the clip are elastically pressed to the nipple whereby the balance weight is fixed to the clip. The clip cannot exit from the first laterally extending groove of the weight whereby the weight is fixed to the clip. In this instance, since the pair of arms and the obliquely extending portion of the clip elastically hold the nipple, the balance weight can be mounted to the nipple stably. Further, since the balance weight can be mounted to the wheel only by pushing the balance weight to the nipple, the mounting of the balance weight to the wheel is easy.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

A balance weight for a two-wheeled vehicle according to the present invention will be explained with reference to FIGS. 1–9.

A balance weight 1 for a two-wheeled vehicle, according to one embodiment of the present invention, is mounted to a nipple (a spoke adjusting portion) 4 for adjusting a tension of a spoke 3 of a two-wheeled vehicle 2.

Figure 1:
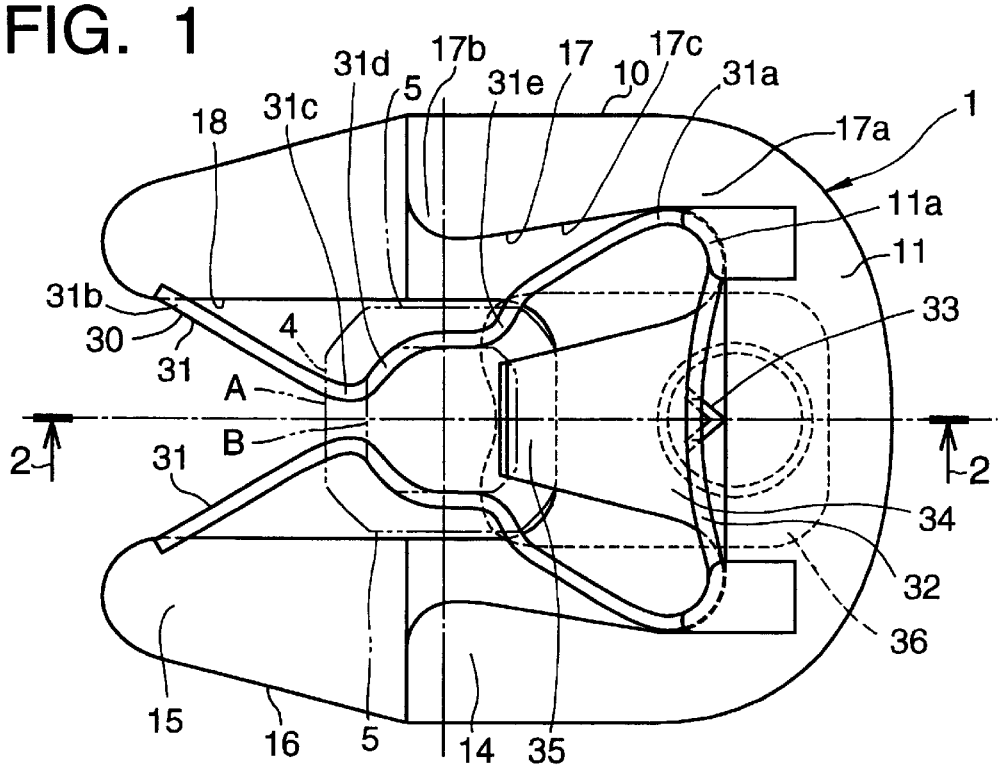
FIG. 1 is a plan view of a balance weight for a two-wheeled vehicle according to an embodiment of the present invention.
Figure 3:
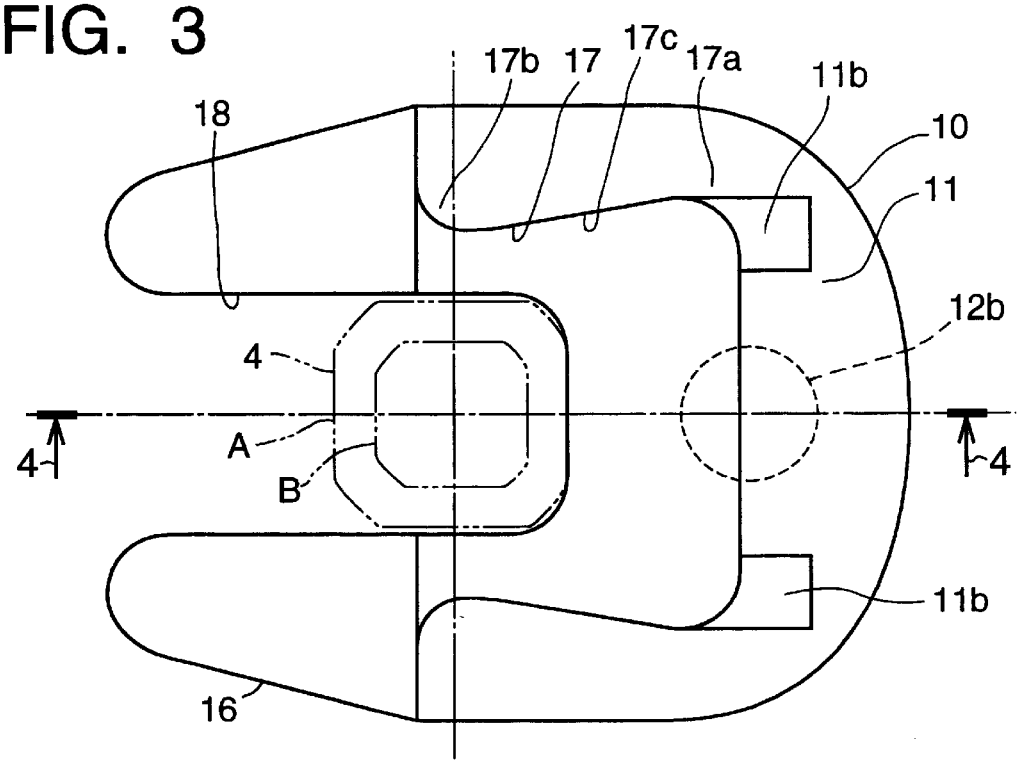
FIG. 3 is a plan view of a weight of the balance weight according to the embodiment of the present invention.

The nipple 4 includes two parallel planes 5, which are engaged and rotated by a spanner so as to adjust the tension of the spoke 3. In FIGS. 1 and 3, two-dotted line A shows the maximum size of the nipple 4, and two-dotted line B shows the minimum size of the nipple 4.

Figure 2:
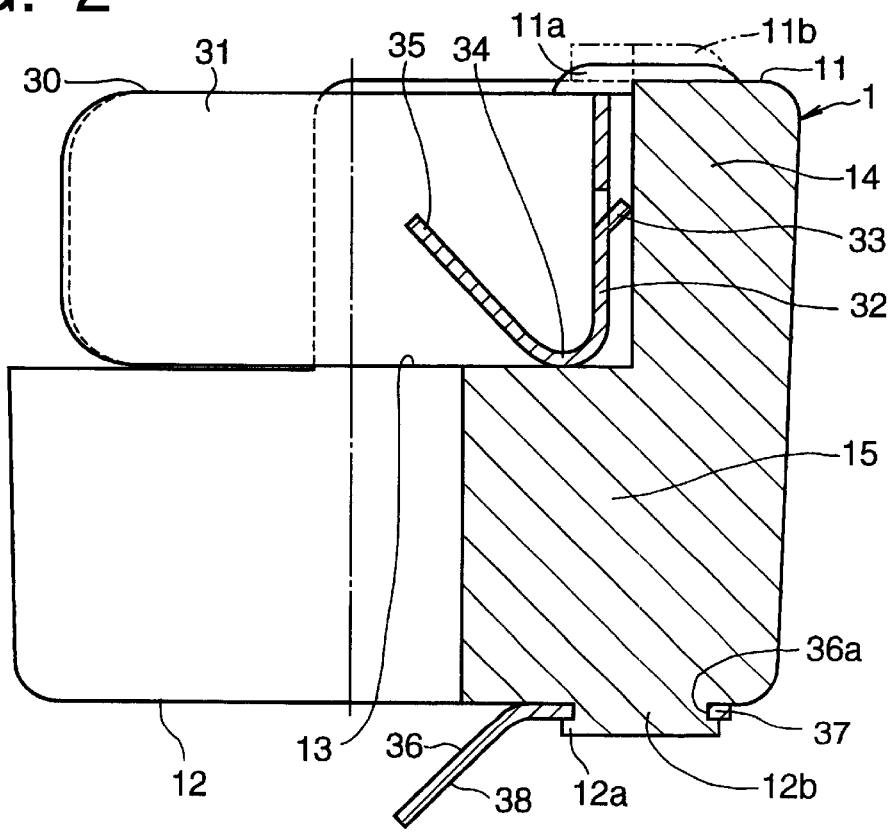
FIG. 2 is a cross-sectional view taken on line 2—2 of FIG. 1.

As illustrated in FIG. 1 and FIG. 2, the balance weight 1 includes a weight 10 and a clip 30.

The weight 10 is made from iron, for example, a cast iron. The clip 30 is made from spring steel. Accordingly, the balance weight 1 of the present invention contains no lead.

The weight 10 has the following structure.

Figure 4:
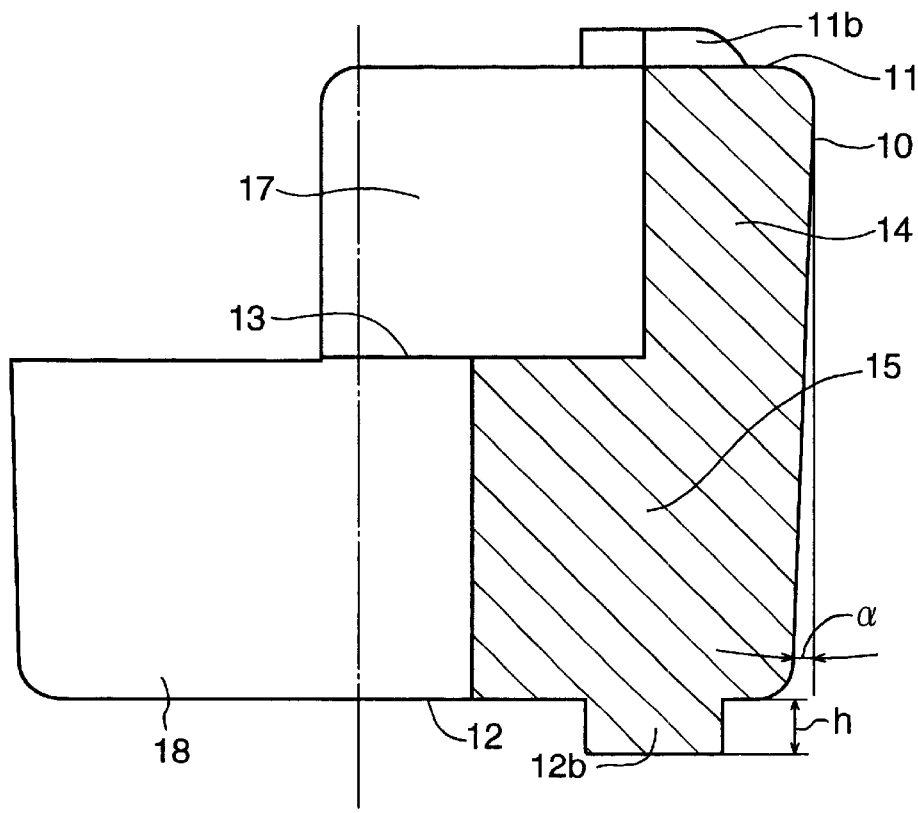
FIG. 4 is a cross-sectional view taken on line 4—4 of FIG. 3.
Figure 5:
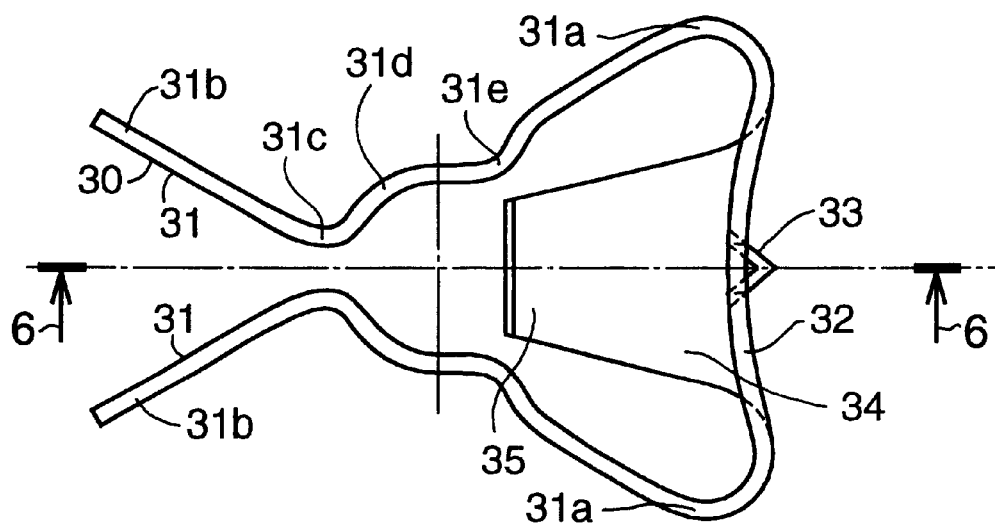
FIG. 5 is a plan view of a clip of the balance weight according to the embodiment of the present invention.
Figure 6:
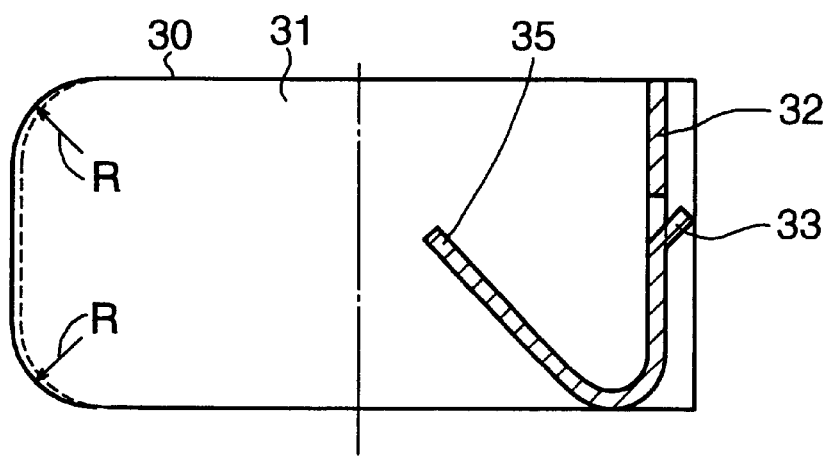
FIG. 6 is a cross-sectional view taken on line 6—6 of FIG. 5.
Figure 7:
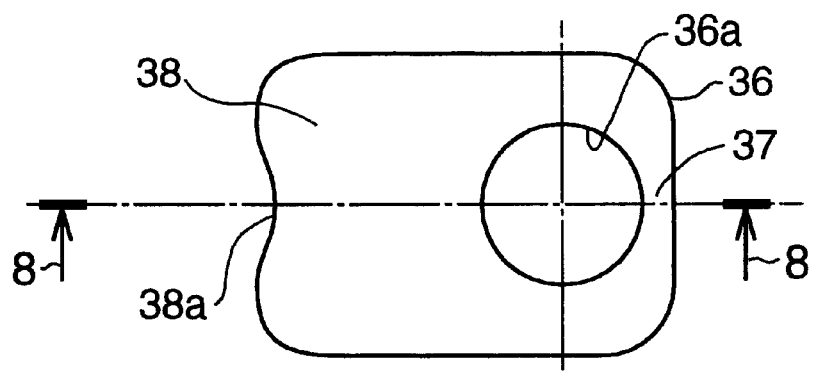
FIG. 7 is a plan view of a tilt-preventing spring of the balance weight according to the embodiment of the present.
Figure 8:
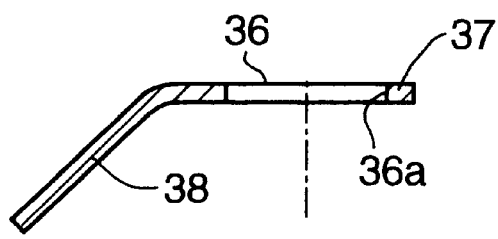
FIG. 8 is a cross-sectional view taken on line 8—8 of FIG. 7.
Figure 9:
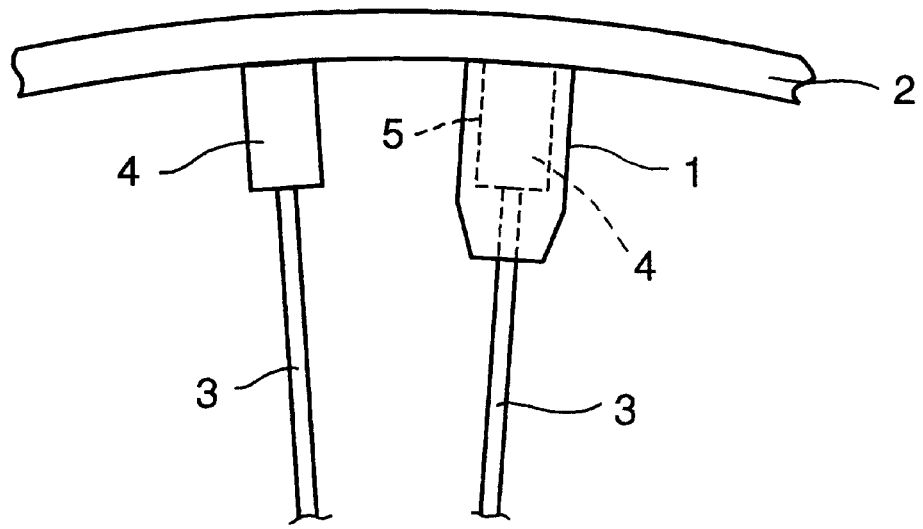
FIG. 9 is a partial view of a two-wheeled vehicle, to which the balance weight of the present invention is mounted.

The weight 10 includes an outside surface 16, a first axial end 11, a second, opposite axial end 12, a transversely extending intermediate surface 13 located between the first end 11 and the second end 12, a first axially extending portion 14 located between the first end 11 and the intermediate surface 13, a second axially extending portion 15 located between the second end 12 and the intermediate surface 13, a first laterally extending groove (a clip holding portion) 17 formed in the first axially extending portion 14 so as to recede in a direction perpendicular to an axial direction of the weight and having a groove bottom portion 17a and a groove inlet 17b smaller in width than the groove bottom portion 17a, and a second laterally extending groove 18 formed in the second axially extending portion 15 so as to recede from the outside surface 16 in the direction perpendicular to the axial direction of the weight. The outside surface 16 is tapered with an angle (α) with respect to an axial direction of the weight, so that an outside configuration of the weight is reduced in a direction from the first end 11 toward the second end 12, as illustrated in FIG. 4.

The first laterally extending groove 17 and the second laterally extending groove 18 recede in the same directions. A centerline of a groove width of the first groove 17 is located in the same plane as that of a groove width of the second groove 18.

The groove inlet 17b is smaller in width than the groove bottom portion 17a, which prevents the clip 30 from exiting from the first groove 17 through the groove inlet 17b when the clip 30 is disposed within and held by the first groove 17.

The clip 30 includes a pair of arms 31, a connecting portion 32 connecting the pair of arms 31 and disposed within and held by the first laterally extending groove 17, an engaging portion (an engaging nail) 33 formed (so as to be cut from the connecting portion at one portion of the nail and integral with the connecting portion 33 at another portion of the nail) in the connecting portion 32 and raised in a direction opposite to the pair of arms 31, a bent portion 34 connected to the connecting portion 32 at one width end of the connecting portion proximate to the transversely extending intermediate surface 13 of the weight 10 and bent from the one width end toward a space between the pair of arms 31, and an obliquely extending portion 35 connected to the bent portion 34 and extending obliquely in a direction away from the transversely extending intermediate surface 13 of the weight 10.

When the balance weight 1 is mounted to the two-wheeled vehicle 2, the pair of arms 31 and the obliquely extending portion 35 of the clip 30 elastically hold the nipple 4 of the spoke 3 whereby the clip 30 is fixed to the nipple 4. The first laterally extending groove 17 holds the clip 30 in the groove 17, and the engaging portion 33 is pressed to the weight 10 whereby the weight 10 is fixed to the clip 30.

Each of the pair of arms 31 of the clip 30 includes a first arm end 31a connected to the connecting portion 32, a second, opposite arm end 31b, an arm bend 31c located between the first arm end 31a and the second arm end 31b, and a nipple pressing portion 31d, located between the first arm end 31a and the arm bend 31c, for pressing the nipple 4 at a corner of a cross section of the nipple 4. Preferably, each of the pair of arms 31 further includes an inversely bent portion 31e between the nipple pressing portion 31d and the first arm end 31a. The nipple pressing portion 31d and the inversely bent portion 31e are bent opposite to each other. The arm bend 31c is bent convexly toward the opposed arm 31. The nipple pressing portion 31d is bent concavely toward the corner of the nipple 4.

Since the arm 31 can be elastically deformed at the first arm ends 31a, even if the size of the nipple 4 changes, the nipple pressing portion 31d can press the nipple 4 at the corner of the cross section of the nipple.

When the balance weight 1 is mounted to the nipple of the wheel of the two-wheeled vehicle 2, the nipple pressing portions 31d of the pair of arms 31 and the obliquely extending portion of 35 are elastically pressed to the nipple 4 from three directions, whereby the clip 30 is fixed to the nipple 4.

Preferably, upper and lower corners of each of the pair of arms 31 of the clip 30 are rounded (as shown by reference R in FIG. 6) for protecting hands of a worker from being injured when the clip 30 is inserted into the weight 10 and is mounted to the nipple 4.

A circular, convex portion 12b is formed at the second end 12 of the weight 10 for fixing a tilt-preventing spring 36 to the weight at the convex portion 12b by deforming (caulking) the convex portion 12b, which will be explained in more detail afterwards. The diameter of the convex portion 12b is equal to or slightly larger than a coupling hole 36a formed in the tilt-preventing spring 36. As illustrated in FIG. 4, a height (h) of the convex portion 12b is larger than a thickness of the tilt-preventing spring 36, which provides a margin for caulking. As illustrated in FIG. 2, when the convex portion 12b is caulked, it forms a caulked portion 12a.

As illustrated in FIGS. 3 and 4, in order that the clip 30 and the weight 10 are securely fixed with each other in the axial direction of the weight, a caulking portion 11a is formed in the weight 10 at a portion of the first axial end 11 where a corner portion between the first arm end 31a and the connecting portion 32 of the clip 30 is disposed. After the clip 30 is coupled to the weight 10, the caulking portion 11b is deformed to form a caulked portion 11a.

The caulked portion 11a prevents the clip 30 from being dislocated in an axial direction in cooperation with the engaging portion 33 of the clip 30. As a result, the clip 30 and the weight 10 are fixed to each other firmly.

Prior to insertion of the nipple 4 into the arms of the clip 30, a distance between the pair of the second arm ends 31b is larger than a distance between the parallel planes of the nipple 4. Due to this structure, only by pushing the clip 30 to the nipple 4, the pair of arms 31 of the clip 30 is widened to permit the nipple to be inserted into the arms.

The first laterally extending groove 17 includes a pair of side surfaces 17c, each extending between the groove bottom portion 17a and the groove inlet 17b, and each tapered with an angle relative to an axis (a center line of a width) of the first laterally extending groove 17. The tapered angle of the side surface 17c with respect to the axis of the first laterally extending groove 17 is set such that the pair of arms 31 of the clip 30 can be deformed without interfering with the pair of side surfaces 17c when the balance weight 1 is mounted to the nipple 4 and a distance between the pair of arms 31 of the clip 30 is widened by the nipple 4.

Further, the second laterally extending groove 18 has a width which is larger than a distance between parallel planes of the nipple 4 of a maximum size. Due to this structure, the weight 10 can be mounted to the nipple 4 of any size.

Preferably, the tilt-preventing spring 36 is provided at the second axial end 12 of the weight 10 for preventing the second axial end 12 of the weight 10 from tilting relative to the nipple 4 when the wheel of the two-wheeled vehicle 2 rotates. The tilt-preventing spring 36 includes a fixed portion 37 where the tilt-preventing spring is fixed to the second axial end 12 of the weight 10, and a tongue 38 obliquely extending in a direction away from the fixed portion 37 and toward the spoke 3 of the two-wheeled vehicle 2. The tongue 38 contacts the spoke 3 at a support portion 38a formed in the tongue 38. The support portion 38a is formed so as to be smoothly curved and concave to the spoke 3. Due to this structure, the balance weight 10 is prevented from tilting relative to the spoke 3 during rotation of the wheel.

The tilt-preventing spring 36 is fixed to the second axial end 12 of the weight 10 by inserting the convex portion 12b formed at the second axial end 12 into the coupling hole 36a formed in the tilt-preventing spring 36, and then caulking the convex portion 12b so that the caulked portion 12a engages the tilt-preventing spring 36.

However, fixing of the tilt-preventing spring 36 is not limited to caulking, and may be conducted by welding.

Next, operation of the balance weight 1 for the two-wheeled vehicle will be explained.

The balance weight 1 is mounted to the nipple (spoke adjusting portion) 4 of the two-wheeled vehicle 2. In this instance, the nipple 4 is inserted into the second laterally extending groove 18 of the weight 10, while the pair of arms 31 of the clip 30 is widened to receive the nipple 4 therein, and the pair of arms 31 and the obliquely extending portion 35 of the clip 30 are elastically pressed to the nipple 4, whereby the balance weight 1 is fixed to the nipple 4. The clip 30 cannot exit from the first laterally extending groove (clip holding portion) 17 of the weight 10, whereby the weight 10 is fixed to the clip 30. More particularly, the clip 30 is fixed relative to the weight (a) in a first direction in which the first groove 17 recedes, by a structure whereby the clip 30 contacts the groove bottom portion 17a of the first laterally extending groove 17 of the weight 10, (b) in a second direction opposite to the first direction, by a structure whereby opposite ends of the connecting portion 32 of the clip 30 interfere with the tapered side surfaces 17c of the first groove 17 of the weight 10, (c) in a third direction perpendicular to the first and second directions, by a structure whereby the opposite ends of the connecting portion 32 of the clip 30 contact opposite curved ends of the groove bottom portion 17a of the first groove 17 of the weight 10, and (d) in the axial direction of the weight 10, by a structure whereby the clip 30 is located between the transversely extending intermediate surface 13 and the caulked portion 11a of the weight 10. Thus, the clip 30 cannot exit from the first laterally extending groove 17 of the weight 10.

Further, since the pair of arms 31 and the obliquely extending portion 35 of the clip 30 are elastically pressed to the nipple 4, the balance weight 1 is fixed to the nipple 4 securely. Furthermore, since the balance weight 1 can be mounted to the wheel only by pushing the balance weight 1 to the nipple 4, the mounting of the balance weight 1 to the wheel is easy.

In addition, since the weight 10 is made from iron, and the clip 30 is made from spring steel, the balance weight 1 is environmentally friendly, unlike the conventional balance weight made from lead.

Since the arm 31 of the clip 30 includes the nipple pressing portion 31d, and the nipple pressing portion 31d is elastically deformed at the first arm end 31a of the arm 31 so that a distance between the pair of arms 31 changes, when a size of the nipple 4 changes between A and B, the nipple pressing portion 31d can contact the corner of the cross section of the nipple 4, and can hold the nipple 4 securely.

Further, since the taper angle of the pair of side surfaces 17c relative to the width center line of the first laterally extending groove 17 is set such that the pair of arms 31 of the clip 30 can be deformed without interfering with the pair of side surfaces 17c, the distance between the pair of arms 31 of the clip 30 is widened, and the pair of arms 31 can receive the nipple 4 between the pair of arms 31, when the balance weight 1 is mounted to the nipple 4.

Further, since the width of the second groove 18 is larger than the distance between the parallel planes of the nipple 4, the nipple 4 can be inserted into the second groove 18 of the weight 10.

The present invention presents the following technical advantages:

First, since the weight is made from iron, and the clip is made from spring steel, the balance weight of the present invention is environmentally friendly, unlike the conventional balance weight made from lead.

The balance weight is mounted to the nipple (spoke adjusting portion) of the two-wheeled vehicle. In this instance, since the pair of arms and the obliquely extending portion of the clip elastically hold the nipple, the balance weight can be fixed to the nipple securely. Further, since the balance weight can be mounted to the nipple only by pushing the balance weight to the nipple, the mounting of the balance weight to the wheel is easy.

Second, since the pair of arms of the clip are elastically deformed and each of the arms includes the nipple pressing portion, the clip can hold the nipple securely irrespective of a change in the size of the nipple.

Third, since a width between the pair of the second arm ends of the clip, prior to insertion of the nipple, is larger than a distance between the parallel planes of the nipple, the nipple can be inserted to the first laterally extending groove of the weight, only by pushing the balance weight to the nipple.

Fourth, since the taper angle of the pair of side surfaces relative to the width center line of the first laterally extending groove is set such that the pair of arms of the clip can be deformed without interfering with the pair of side surfaces, the distance between the pair of arms of the clip can be widened and can receive the nipple 4 therein.

Fifth, since the width of the second laterally groove is larger than the distance between the parallel planes of the nipple, the nipple can be inserted into the second laterally groove of the weight.

Sixth, since a caulking portion is provided at the first axial end of the weight, and the caulking portion axially engages the clip at the opposite ends of the connecting portion of the clip, the weight and the clip are securely coupled to each other in the axial direction of the weight.

Seventh, since the pair of arms of the clip each includes the nipple pressing portion between the first arm end and the arm bend, the clip can hold the nipple stably, irrespective of a change in the size of the nipple.

Eighth, since the pair of arms of the clip each includes the inversely bent portion located between the nipple pressing portion and the first arm end, the clip can hold the parallel planes of the nipple as well as the corners of the cross section of the nipple, which enables the clip to hold the nipple more stably.

Ninth, since the tilt-preventing spring is provided to the weight, the weight is prevented from tilting relative to the spoke during the rotation of the wheel.

Tenth, since the tilt-preventing spring includes the fixed portion fixed to the second axial end of the weight and the tongue obliquely extending in a direction away from the fixed portion and toward the spoke axis, the structure is simple and the fixing is easy.

The foregoing description of the embodiments of the present invention provides illustration and description, but is not intended to be exhaustive or to limit the invention to the precise form disclosed. Modifications and variations are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A balance weight for a two-wheeled vehicle comprising:
   a weight made from iron; and
   a clip made from spring steel,
   said weight including:
      an outside surface;
      a first axial end;
      a second, opposite axial end;
      a transversely extending intermediate surface located between said first end and said second end;
      a first axially extending portion located between said first end and said intermediate surface;
      a second axially extending portion located between said second end and said intermediate surface;
      a first laterally extending groove for holding said clip, formed in said first axially extending portion and having a groove bottom portion and a groove inlet portion smaller in width than said groove bottom portion, said first laterally extending groove holding said clip; and
      a second laterally extending groove formed in said second axially extending portion so as to recede from said outside surface,
   said clip including:
      a pair of arms;
      a connecting portion connecting said pair of arms and disposed within and held by said first laterally extending groove;
      an engaging portion formed in said connecting portion and raised in a direction opposite to said pair of arms;
      a bent portion connected to said connecting portion at one width end proximate to said transversely extending intermediate surface of said weight and bent from said one width end toward a space between said pair of arms; and
      an obliquely extending portion connected to said bent portion and extending obliquely in a direction away from said transversely extending intermediate surface of said weight;
   wherein when said balance weight is mounted to the two-wheeled vehicle, said pair of arms and said obliquely extending portion of said clip elastically hold a nipple of a spoke of the two-wheeled vehicle whereby said clip is fixed to the nipple, and said first laterally extending groove holds said clip and said engaging portion is pressed to said weight whereby said weight is fixed to said clip.

2. A balance weight according to claim 1, wherein each of said pair of arms of said clip further includes:
   a first arm end where each of said pair of arms is connected to said connecting portion of said clip;
   a second, opposite arm end;
   an arm bend located between said first arm end and said second arm end; and
   a nipple pressing portion, located between said first arm end and said arm bend, for pressing the nipple at a corner of a cross section of the nipple, wherein when said balance weight is mounted to the two-wheeled vehicle, said nipple pressing portion of each of said pair of arms and said obliquely extending portion of said clip are elastically pressed to the nipple whereby said clip is fixed to the nipple.

3. A balance weight according to claim 1, wherein said pair of arms of said clip include first arm ends where pair of arms are connected to said connecting portion and second, opposite arm ends, and a distance between said second arm ends of said clip is larger than a distance between parallel planes of the nipple prior to insertion of said nipple into said arms of said clip.

4. A balance weight according to claim 1, wherein said first laterally extending groove includes a pair of side surfaces each extending between said groove bottom portion and said groove inlet and each tapered with an angle relative to a center line between said pair of side surfaces, and said angle of each of said pair of side surfaces is set such that said pair of arms of said clip can be deformed without interfering with said pair of side surfaces when said balance weight is mounted to the nipple and a distance between said pair of arms of said clip is widened by the nipple.

5. A balance weight according to claim 1, wherein said second laterally extending groove has a width which is larger than a distance between parallel planes of the nipple.

6. A balance weight according to claim 1, wherein said weight includes a caulking portion at said first axial end, for axially engaging said clip at opposite ends of said connecting portion.

7. A balance weight according to claim 2, wherein said nipple pressing portion and said arm bend are bent opposite to each other.

8. A balance weight according to claim 7, wherein each of said pair of arms has an inversely bent portion between said nipple pressing portion and said first arm end, and said nipple pressing portion and said inversely bent portion are bent opposite to each other.

9. A balance weight according to claim 1, further comprising:
    a tilt-preventing spring, separate from said weight and said clip and assembled to said weight, for preventing said weight from tilting relative to the spoke.

10. A balance weight according to claim 9, wherein said tilt-preventing spring includes:
    a fixed portion where said tilt-preventing spring is fixed to said weight at said second axial end; and
    a tongue obliquely extending in a direction away from said fixed portion and toward the spoke of the two-wheeled vehicle.

* * * * *